(12) United States Patent
Kim et al.

(10) Patent No.: US 11,958,571 B2
(45) Date of Patent: Apr. 16, 2024

(54) MARITIME WIRELESS COMMUNICATION SYSTEM AND METHOD THEREOF

(71) Applicant: GWANGJU INSTITUTE OF SCIENCE AND TECHNOLOGY, Gwangju (KR)

(72) Inventors: Ki Seon Kim, Gwangju (KR); Myoung Shin Kwak, Gwangju (KR); Pranesh Psthapit, Gwangju (KR); Min Seok Kim, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 17/348,116

(22) Filed: Jun. 15, 2021

(65) Prior Publication Data
US 2022/0161898 A1 May 26, 2022

(30) Foreign Application Priority Data
Nov. 25, 2020 (KR) .......................... 10-2020-0160427

(51) Int. Cl.
*B63B 22/00* (2006.01)
*G08C 17/02* (2006.01)
(Continued)

(52) U.S. Cl.
CPC .............. *B63B 22/00* (2013.01); *G08C 17/02* (2013.01); *H04B 17/327* (2015.01);
(Continued)

(58) Field of Classification Search
CPC . B63B 22/00; B63B 2022/006; H04B 17/336; H04B 17/327; G08C 17/02; H04L 67/12
See application file for complete search history.

(56) References Cited

U.S. PATENT DOCUMENTS

2017/0092096 A1\* 3/2017 Fernandes ................. E04H 4/00
2018/0244354 A1\* 8/2018 Opshaug ............... A01K 97/125
(Continued)

FOREIGN PATENT DOCUMENTS

| KR | 10-1159510 | 6/2012 |
|---|---|---|
| KR | 10-1176378 | 8/2012 |

(Continued)

OTHER PUBLICATIONS

English Specification of 10-2085630.
(Continued)

*Primary Examiner* — Derrick W Ferris
*Assistant Examiner* — M Mostazir Rahman
(74) *Attorney, Agent, or Firm* — Dinsmore & Shohl LLP; Yongsok Choi, Esq.

(57) ABSTRACT

According to an embodiment, a maritime wireless communication system comprises a communication module installed in the at least one buoy, providing sensing information, identification information, and location information for the at least one buoy and a gateway device installed in each of a fishing vessel terminal device and a managing vessel terminal device, performing communication with the at least one buoy and a land control center via a long range (LoRa)-based communication network to provide various (Continued)

types of fishery information, and setting different communication options for a normal condition and the event condition in performing a communication connection function.

8 Claims, 6 Drawing Sheets

(51) Int. Cl.
H04B 17/327 (2015.01)
H04B 17/336 (2015.01)
H04L 67/12 (2022.01)

(52) U.S. Cl.
CPC ........... *H04B 17/336* (2015.01); *H04L 67/12* (2013.01); *B63B 2022/006* (2013.01)

(56) References Cited

U.S. PATENT DOCUMENTS

| | | | | |
|---|---|---|---|---|
| 2019/0185122 | A1* | 6/2019 | Hamme | B63C 11/26 |
| 2020/0020221 | A1* | 1/2020 | Cutler | H04W 4/70 |
| 2020/0322055 | A1* | 10/2020 | Jones | H04B 10/27 |
| 2020/0324897 | A1* | 10/2020 | Chen | B63B 22/00 |
| 2021/0048534 | A1* | 2/2021 | Kang | G01S 19/17 |

FOREIGN PATENT DOCUMENTS

| | | |
|---|---|---|
| KR | 10-2017-0063473 | 6/2017 |
| KR | 10-2017-0085747 | 7/2017 |
| KR | 10-2017-0095090 | 8/2017 |
| KR | 10-2017-0095091 | 8/2017 |
| KR | 10-2017-0098572 | 8/2017 |
| KR | 20-2018-0000420 | 2/2018 |
| KR | 10-2018-0041460 | 4/2018 |
| KR | 10-1858845 | 5/2018 |
| KR | 10-2018-0061917 | 6/2018 |
| KR | 10-2018-0090444 | 8/2018 |
| KR | 10-2018-0108087 | 10/2018 |
| KR | 10-2019-0048223 | 5/2019 |
| KR | 10-2019-0052197 | 5/2019 |
| KR | 10-1978065 | 5/2019 |
| KR | 10-2019-0084639 | 7/2019 |
| KR | 10-2000483 | 7/2019 |
| KR | 10-2002943 | 7/2019 |
| KR | 10-2019-0119473 | 10/2019 |
| KR | 10-2019-0121489 | 10/2019 |
| KR | 10-2019-0121490 | 10/2019 |
| KR | 10-2020-0027112 | 3/2020 |
| KR | 10-2085630 | 3/2020 |
| KR | 10-2020-0050608 | 5/2020 |
| KR | 10-2020-0063285 | 6/2020 |

OTHER PUBLICATIONS

English Specification of 10-2002943.
English Specification of 10-1858845.
English Specification of 10-2020-0050608.
Jae-Min Kwak, Seong-Real Lee, "Buoy-launched Terminal Equipment and Ship-launched Gateway Equipment based on LoRa for Identification of Fishing Gear," JKICE, vol. 22, No. 5: 779-786, May 2018.
Seong-Real Lee, Hyung-dong Choi, Tae-suk Kim, "Wireless Node for Automatic Monitoring System of Fishing Gear," Proceedings of the Korean Institute of Information and Commucation Sciences Conference, 23(2), 466-469, Oct. 2019.
English translation of "Jae-Min Kwak, Seong-Real Lee, "Buoy-launched Terminal Equipment and Ship-launched Gateway Equipment based on LoRa for Identification of Fishing Gear," JKICE, vol. 22, No. 5: 779-786, May 2018".
English translation of "Seong-Real Lee, Hyung-dong Choi, Tae-suk Kim, "Wireless Node for Automatic Monitoring System of Fishing Gear," Proceedings of the Korean Institute of Information and Commucation Sciences Conference, 23(2), 466-469, Oct. 2019".
English Specification of 10-2000483.
English Specification of 10-1978065.
English Specification of 10-2019-0052197.
English Specification of 10-2019-0048223.
English Specification of 10-2017-0063473.
English Specification of 10-2018-0108087.
English Specification of 10-2018-0090444.
English Specification of 10-2018-0061917.
English Specification of 10-2018-0041460.
English Specification of 20-2018-0000420.
English Specification of 10-2017-0098572.
English Specification of 10-2017-0095091.
English Specification of 10-2017-0095090.
English Specification of 10-2017-0085747.
English Specification of 10-2020-0063285.
English Specification of 10-2020-0027112.
English Specification of 10-2019-0121489.
English Specification of 10-2019-0121490.
English Specification of 10-2019-0119473.
English Specification of 10-2019-0084639.
English Specification of 10-1159510.
English Specification of 10-1176378.

* cited by examiner

Fig. 6

| Bitrate | Chips/symbol | SNR limit | Time-on-air (10byte packet) | Spreading Factor |
|---|---|---|---|---|
| 7 | 128 | -7.5 | 56 ms | 5469 bps |
| 8 | 256 | -10 | 103 ms | 3125 bps |
| 9 | 512 | -12.5 | 205 ms | 1758 bps |
| 10 | 1024 | -15 | 371 ms | 977 bps |
| 11 | 2048 | -17.5 | 741 ms | 537 bps |
| 12 | 4096 | -20 | 1483 ms | 293 bps |

MARITIME WIRELESS COMMUNICATION SYSTEM AND METHOD THEREOF

CROSS-REFERENCE TO RELATED APPLICATION(S)

This application is based on and claims priority under 35 U.S.C. 119 to Korean Patent Application No. 10-2020-0160427, filed on Nov. 25, 2020, in the Korean Intellectual Property Office, the disclosure of which is herein incorporated by reference in its entirety.

This invention was made with Korean government support under the Korea Institute of Marine Science & Technology Promotion (KIMST) grant funded by the Korea government (Ministry of Oceans and Fisheries) (No. 201703882).

TECHNICAL FIELD

Embodiments of the disclosure relate to a maritime wireless communication technology capable of ensuring communication connectivity on the sea.

DESCRIPTION OF RELATED ART

The description of the Discussion of Related Art section merely provides information that may be relevant to embodiments of the disclosure but should not be appreciated as necessarily constituting the prior art.

Advanced maritime countries have been continuously developing technologies for monitoring and integrated management of fishing gear and fishing conditions of fishing vessels based on communication and navigation system technology. In particular, Norway, Canada, and France have launched global fishing gear monitoring and integrated management systems onto the world market.

Fishing gear monitoring may require technology adopting various sensors (such as ones for measuring or obtaining, e.g., fishing net angle, array, distance, temperature, pressure, tension, or sound) available underwater, underwater acoustic communication technology, electronic nautical chart-based integrated management catch monitoring technology, and fishery management support system technology.

To minimize damages caused by lost gear, the South Korean Government announced the Electronic Fishing Gear Real Name System in 2016. There is a need for communication technology that may efficiently transmit information including the type and location of fishing gear and users' real names to fishing vessels and the land control center so as to reduce the excessive use and waste of fishing gear.

Most countries, including South Korea, have currently adopted automatic fishing gear identification buoys to efficiently manage fishing gear and have been developing technology for monitoring fishing gear of fishing vessels at sea using medium-range (2 km or less) wireless communication.

Commercial technology is available in which the fishing vessel receives location information from an electronic buoy installed on fishing gear and displays the received information on the global positioning system (GPS) plotter of the fishing vessel. However, there are still insufficient research efforts and technological solutions for fishing gear monitoring, integrated support monitoring, and land control center operation to comprehensively provide fishing gear and fishing ground information through, e.g., automatic identification buoys and fishing gear state information.

One-to-one wireless communication is mostly adopted between buoy and vessel using the automatic identification system (AIS) communication channel frequency for vessels. In South Korea, use of automatic fishing gear identification buoys is prohibited due to interference with AIS communication between ships. The land control center needs to identify multiple buoys and location information about each buoy through land base stations. However, current fishing gear controlling is mostly limited to fishing monitoring.

Therefore, a need exists for development of a system that enables monitoring and control by remotely sending various types of fishing information, such as the location and condition (or situation) of fishing gear and the location of lost fishing gear, to fishing vessels, managing vessels, and land control center. Implementation of such a fishing gear monitoring and control system may need reliable information transmission/reception via a low-power, long-range communication network and automation of fishing gear management and remote monitoring and control on fishing vessels and the land.

SUMMARY

According to embodiments of the disclosure, LoRa-based gateway devices may be implemented to allow a buoy, a fishing vessel terminal device, and a managing vessel terminal device to communicate with one another and transmit information to a land control center. It is possible to change communication options (e.g., spreading factors) for reliable information transmission/reception when an event, e.g., emergency, occurs.

However, the objects of the embodiments are not limited thereto, and other objects may also be present.

According to an embodiment, a maritime wireless communication system performing wireless communication between at least one buoy, a fishing vessel terminal device, a managing vessel terminal device, or a land control center comprises a communication module installed in the at least one buoy, providing sensing information using at least one sensor, providing identification information and location information for the at least one buoy, and ensuring communication connectivity when an event condition including fishing gear loss occurs and a gateway device installed in each of the fishing vessel terminal device and the managing vessel terminal device, performing communication with the at least one buoy and the land control center via a long range (LoRa)-based communication network to provide various types of fishery information including locations and conditions of a fishing vessel and fishing gear and a location of lost fishing gear, and setting different communication options for a normal condition and the event condition in performing a communication connection function. The communication module of the at least one buoy and the gateway device installed in each of the fishing vessel terminal device and the managing vessel terminal device form a main communication channel through a public LoRa network for low-power long-range communication and, in a shadow area, releases the main communication channel with the public LoRa network and then forms a sub communication channel through a private LoRa network. The gateway device sets a reference spreading factor applied to each of the at least one buoy based on a communication quality of the at least one buoy and changes the reference spreading factor into a spreading factor higher than the reference spreading factor when the event condition occurs in performing communication with the at least one buoy.

The at least one buoy may include a power module providing power required for operating the at least one buoy, a sensor module including at least one of a temperature sensor, an acceleration sensor, and an acoustic sensor and providing detected information, a global positioning system (GPS) reception module providing the location information for the at least one buoy using a GPS signal, a light indicator (e.g., a lamp) indicating a location of the at least one buoy, and a control module processing a signal transmitted or received by the communication module and controlling an overall operation of the at least one buoy.

The gateway device may measure the communication quality based on signal quality including a received signal strength indication (RSSI) or a signal-to-noise ratio (SNR) of a signal transmitted or received with the at least one buoy.

The gateway device may include a broadband communication module supporting Internet-of-things (IoT) platform-based low-power broadband communication, a public LoRa module supporting a wireless protocol with the public LoRa network, a private LoRa module supporting a wireless protocol with the private LoRa network, a GPS reception module providing location information for the fishing vessel terminal device or the managing vessel terminal device using a GPS signal, and a control module selectively connecting to the public LoRa network or the private LoRa network depending on a state of the public LoRa network or the private LoRa network, setting a communication option depending on the normal condition or the event condition, and controlling the broadband communication module, the public LoRa module, the private LoRa module, and the GPS reception module.

According to an embodiment, a maritime wireless communication method performing wireless communication between at least one buoy, a fishing vessel terminal device, a managing vessel terminal device, or a land control center comprises setting a reference spreading factor applied to each of the at least one buoy based on a communication quality of the at least one buoy by a gateway device installed in the fishing vessel terminal device or the managing vessel terminal device, performing communication with the at least one buoy using the set reference spreading factor to receive sensing information obtained using at least one sensor and identification information and location information for the at least one buoy, and analyzing the information received from the at least one buoy and, when an event condition including a stealing or loss of the at least one buoy is detected, changing the reference spreading factor into a spreading factor higher than the reference spreading factor in performing communication with the at least one buoy.

The communication quality may be measured based on signal quality including a received signal strength indication (RSSI) or a signal-to-noise ratio (SNR) of a signal transmitted or received with the at least one buoy.

The maritime wireless communication method may further comprise, before setting the reference spreading factor, forming a main communication channel through a public LoRa network for low-power, long-range communication and, in a shadow area, releasing the main communication channel with the public LoRa network and then forming a sub communication channel through a private LoRa network.

According to embodiments of the disclosure, maritime wireless communication is performed based on a commercial (e.g., public) LoRa network and, in a shadow area which is out of communication coverage, wireless communication is performed via a communication channel with a private LoRa network. Therefore, it is possible to ensure wireless communication connectivity at sea and thus efficiently transmit or receive information between the buoys, fishing vessels, managing vessels, and the land control center.

According to embodiments of the disclosure, the spreading factor affecting the communication quality of the LoRa network is changed depending on the normal condition and event condition (e.g., an emergency) using monitoring technology for managing fishing gear, so that reliable information transmission may be performed.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 6 is a view illustrating a LoRa-based communication option according to an embodiment.

DETAILED DESCRIPTION

Figure 1:
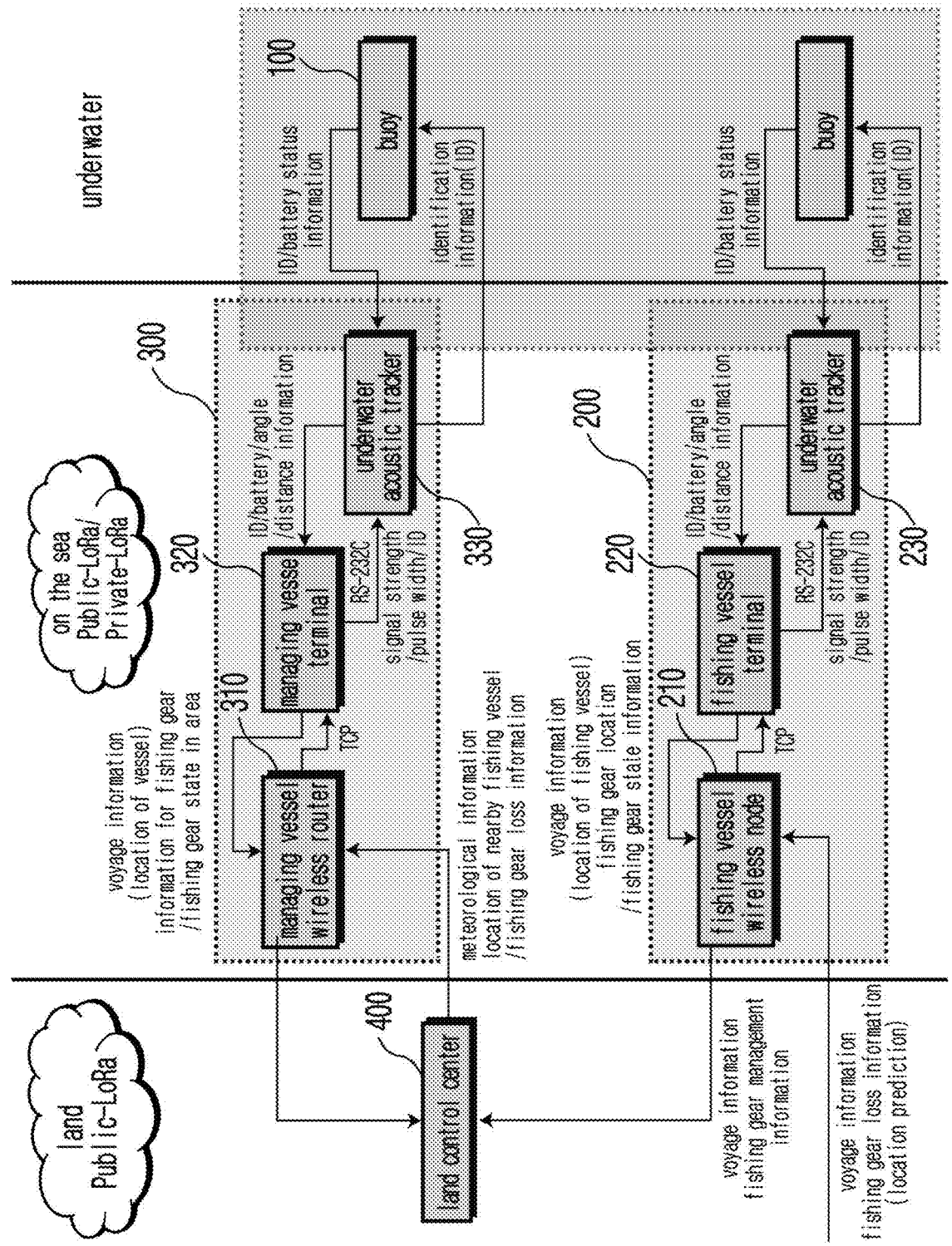
FIG. 1 is a view illustrating a configuration of a maritime wireless communication system according to an embodiment.

Hereinafter, exemplary embodiments of the inventive concept will be described in detail with reference to the accompanying drawings. The inventive concept, however, may be modified in various different ways, and should not be construed as limited to the embodiments set forth herein. Like reference denotations may be used to refer to the same or similar elements throughout the specification and the drawings. However, the disclosure may be implemented in other various forms and is not limited to the embodiments set forth herein. For clarity of the disclosure, irrelevant parts are removed from the drawings, and similar reference denotations are used to refer to similar elements throughout the specification.

In embodiments of the disclosure, when an element is "connected" with another element, the element may be "directly connected" with the other element, or the element may be "electrically connected" with the other element via an intervening element. When an element "comprises" or "includes" another element, the element may further include, but rather than excluding, the other element, and the terms "comprise" and "include" should be appreciated as not excluding the possibility of presence or adding one or more features, numbers, steps, operations, elements, parts, or combinations thereof.

In the disclosure, the term 'terminal' or 'terminal device' may refer to a wireless communication device with portability and mobility, and may be any kind of handheld wireless communication device, such as a smart phone, a tablet PC, or a laptop computer. The term 'terminal' or 'terminal device' may refer to a wired communication device, such as a personal computer (PC) that may access other terminals or servers using a network. The network refers to a connection structure that may exchange information between nodes, such as terminals and servers, and may include, but is not limited to, a local area network (LAN), a wide area network (WAN), the Internet (world wide web (WWW)), a wired/wireless data communication network, a telephone network, or a wired/wireless television communication network. Examples of wireless data networks include, but are not limited to, 3G, 4G, 5G, 3rd generation partnership project (3GPP), long term evolution (LTE), world interoperability for microwave access (WIMAX), wireless-fidelity (Wi-Fi), Bluetooth communication, infrared communication, ultrasound communication, visible light communication (VLC), and Li-Fi networks.

Example embodiments are described below for a better understanding of the disclosure, but the disclosure is not limited thereto. Therefore, it should be noted that any embodiment performing substantially the same function as the embodiments disclosed herein belong to the scope of the disclosure.

The components, processes, steps, or methods according to embodiments of the disclosure may be shared as long as they do not technically conflict with each other.

Hereinafter, embodiments of the disclosure are described in detail with reference to the accompanying drawings.

LoRa (Long Range) is a standard based on IEEE 802.15.4g and may implement asynchronous low-power, long-range communication networks. The Internet-of-things (IoT) scenario using LoRa may be used for similar purposes to the CDMA/LTE modem-type IoT scenario currently in use but provides much easier accessibility. The scheme using LoRa and the scheme using CDMA/LTE modem are commonly used in outdoor environments where no network is established or in environments where a network is difficult to establish, rather than indoor environments where a network may easily be established.

LoRa may receive or handle a large number of terminals by a simple access procedure and allows the terminal to access a plurality of base stations, thereby enabling data transmissions from/to the terminal via an optimal path. LoRa allows for low-cost establishment by simplified connection between terminal and base station, high resistance to signal interference, and optimal frequency use.

According to the disclosure, there is provided a monitoring and integrated control technique that may perform communication between a buoy, a terminal device for a fishing vessel (simply, referred to as a fishing vessel terminal device), a terminal device for a managing vessel (simply, referred to as a managing vessel terminal device), and a land control center via a LoRa-based communication network, receive information from the buoy, and remotely monitor and manage the deployment of fishing gear (including buoys, gillnets, or other fishing tools) and loss of fishing gear.

FIG. 1 is a view illustrating a configuration of a maritime wireless communication system according to an embodiment.

Referring to FIG. 1, a maritime wireless communication system may include at least one or more buoys 100, a terminal device 200 for a fishing vessel (also referred to herein as a fishing vessel terminal device 200), a terminal device 300 for a managing vessel (also referred to herein as a managing vessel terminal device 300), and a land control center 400.

The buoys 100 are detachably installed on fishing gear, e.g., gillnets, at regular intervals, provide sensing information using at least one sensor, and provides its own identification information and location information. The buoy may include various sensors, such as a temperature sensor, an acceleration sensor, a water detection sensor, or an acoustic sensor (or sound sensor) for underwater acoustic communication (e.g., sound wave communication).

The fishing vessel terminal device 200 may be installed in a fishing vessel. The fishing vessel terminal device 200 register its fishing gear identification information in the at least one or more buoys 100 and communicates with the buoy 100 to identify location information for the buoy 100. For example, the fishing vessel terminal device 200 may register identification information for fishing gear related to the fishing vessel terminal device 200 in at least one buoy 100 and obtain location information for the buoy 100 related to the fishing vessel terminal device 200 via communication with the buoy 100. The fishing vessel terminal device 200 provides fishing vessel information including fishing vessel identification information, fishing vessel location information, fishing gear identification information, and buoy location information to the land control center 400. For example, the fishing vessel terminal device 200 may provide fishing vessel information including identification information and location information for the fishing vessel in which the fishing vessel terminal device 200 is installed and identification information and location information for the buoy related to the fishing vessel terminal device 200 to the land control center 400.

The managing vessel terminal device 300 may be installed in a managing vessel. Upon receiving loss information for a buoy or a fishing gear from the land control center 400, the managing vessel terminal device 300 may perform an operation for recovering the lost fishing gear by performing fishing gear scanning. The managing vessel terminal device 300 needs to know or have the location of (or location information for) fishing vessels and buoys that it manages or is in charge of for fishing guidance or control. The managing vessel terminal device 300 includes a managing vessel wireless router 310, a managing vessel terminal 320, and an underwater acoustic tracker (also referred to as a sound tracker) 330.

The land control center 400 manages fishing gears or fishing vessels within a predetermined area, transmits and receives information to/from the fishing vessel terminal device 200 and the buoy 100 using a communication network, and detects a stealing or loss of the buoy 100 and notifies the fishing vessel terminal device 200 or the managing vessel terminal device 300 of the stealing or loss of the buoy.

The fishing vessel wireless node 210 and the managing vessel wireless router 310 are gateways (or also referred to as gateway devices) for LoRa-based wireless relay communication. The fishing vessel wireless node 210 and the managing vessel wireless router 310 are connected with a plurality of buoys 100, located within a predetermined radius (e.g., 10 Km) from the fishing vessel, through communication channels and transmit/receive information to/from the buoys 100.

The fishing vessel terminal 220 and the managing vessel terminal 320 may be common server computers or may be other various types of devices that may function as servers. For example, the fishing vessel terminal 220 and the managing vessel terminal 320 each may be implemented as a computing device including a communication module (not shown), a memory (not shown), a processor (not shown), and a database (not shown).

The land control center 400 may receive integrated information, such as information operated in, e.g., an intelligent navigation system (INS), integrated maritime information technology (IMIT), or marine environment information system (MEIS) in the fishing vessel terminal 220 or the managing vessel terminal 320, through a communication network, thereby monitoring the current state of the vessel in real-time.

The land control center 400 uses a communication platform to support a communication protocol of a commercial LoRa network (also referred to herein as a public LoRa (network)) and a broadband network (Cat.M1). The land control center 400 may transmit buoy state information (including, e.g., GPS information, buoy location information, fishing gear identification information, and battery information), meteorological information (e.g., weather information), and fishing gear loss information through a downlink, and may receive voyage information (e.g., vessel information, abnormality or defect, location, speed, or sailing direction) through an uplink.

To this end, the land control center 400 may fetch or store information from a database storing fishing gear identification information, fisherman information, information for the area controlled or administered by each managing vessel, and fishing vessel information, through commercial network data linkage middleware.

Therefore, the land control center 400 grasps, on land, the location of at least one or more fishing gear and at least one or more buoys, and communicates with the managing vessel terminal device 300 or the fishing vessel terminal device 200 to thereby perform remote monitoring between the land and the managing vessel/fishing vessel. Accordingly, the land control center 400 provides meteorological information and ocean condition information to the vessel, and receives the integrated information for the vessel to thereby perform real-time monitoring and control of the vessel, on land. For example, the land control center 400 displays the state of the vessel, received by wireless communication (e.g., via a satellite or wireless communication modem) to the vessel, and transmits MEIS meteorological information and control commands to the vessel and transmits control signals to the buoy.

Figure 2:
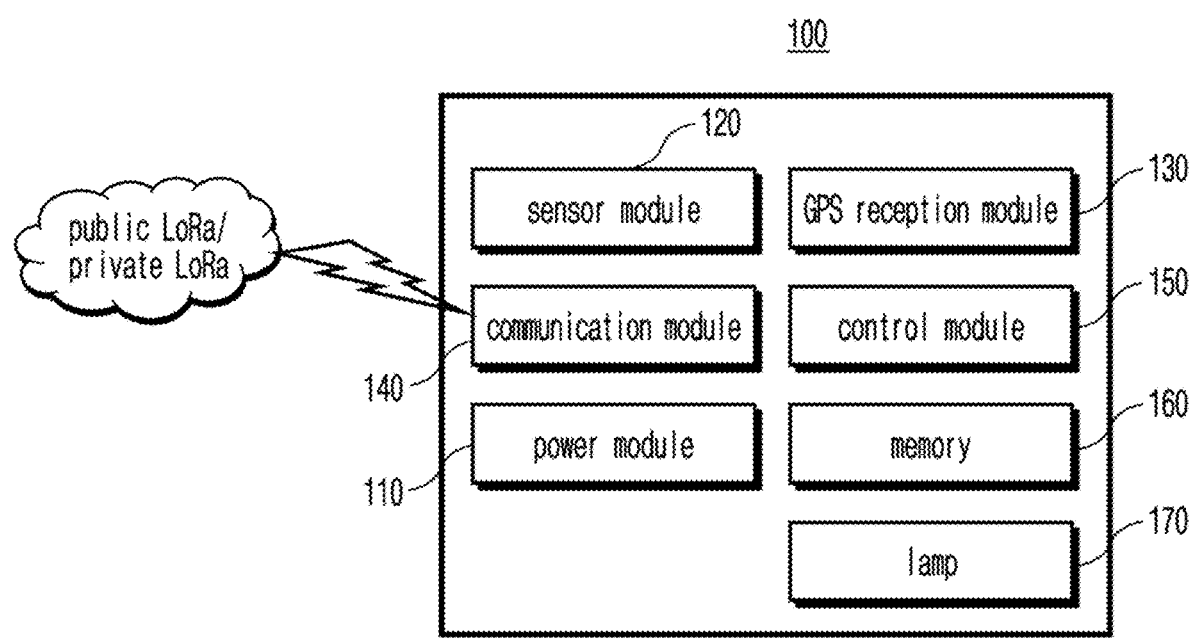
FIG. 2 is a view illustrating a configuration of a buoy according to an embodiment.

FIG. 2 is a view illustrating a configuration of a buoy according to an embodiment.

The buoy 100 may include, but is not limited to, a power module 110 (e.g., a power source), a sensor module 120 (e.g., at least one sensor), a global positioning system (GPS) reception module 130 (e.g., a GPS receiver), a communication module 140 (e.g., a transceiver or a communication circuit), and a control module 150 (e.g., a controller).

The power module 110 provides power required for the operation of the buoy 100. The power module 110 may report the state of the battery to the fishing vessel terminal device 200 or the managing vessel terminal device 300 using the communication module 140.

The sensor module 120 may include at least one of a temperature sensor, an acceleration sensor, and an acoustic sensor, and provides sensor information detected or obtained by the sensor to the control module 150.

The GPS reception module 130 provides the current location (or location information) of the buoy to the control module 150 using a GPS signal received from a GPS satellite. The GPS reception module 130 may receive a signal from a global navigation satellite system (GNSS) or a satellite based augmentation system (SBAS) to thereby provide location information with high accuracy.

The communication module 140 may communicate with the fishing vessel terminal device 200, the managing vessel terminal device 300, and the land control center 400 by selectively using a commercial LoRa and a private LoRa depending on the state of the radio wave. The communication module 140 may connect the fishing vessel wireless node 210 or the managing vessel wireless router 310 to a LoRa-based communication network.

The buoy 100 may further include a light indicator (e.g., a lamp) 170 that allows the buoy 100 or its position to be identified with the naked eye at night.

The buoy 100 may further include a memory 160. The control module 150 may control the overall operation of each component in the buoy 100 using various programs stored in the memory 160 and process signals transmitted and received by the communication module 140.

The memory 160 may store identification information and control information for the buoy 100 as well as a program for controlling the operation of the buoy 100.

Figure 3:
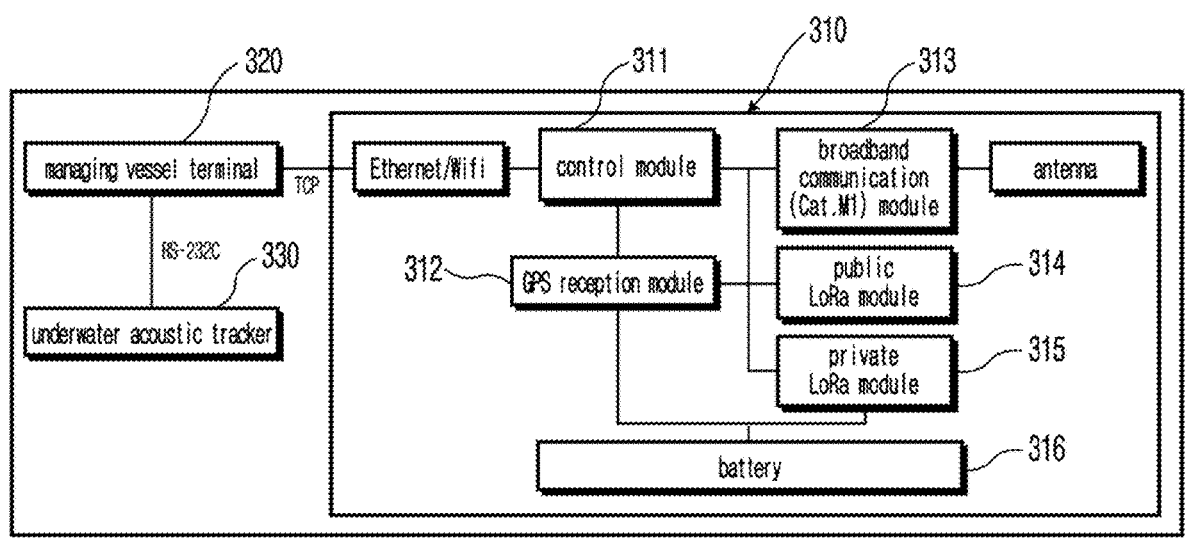
FIG. 3 is a view illustrating a configuration of a terminal device for a managing vessel according to an embodiment.

FIG. 3 is a view illustrating a configuration of a terminal device for a managing vessel according to an embodiment.

Referring to FIG. 3, the managing vessel terminal device 300 includes, but is not limited to, a managing vessel wireless router 310, a managing vessel terminal 320, and an underwater acoustic tracker 330.

The managing vessel wireless router 310 is a gateway device and includes a broadband communication module 313 (e.g., a transceiver or a communication circuit), a commercial LoRa module 314 (e.g., a network interface or connector with a commercial LoRa network), a private LoRa module 315 (e.g., a network interface or connector with a private LoRa network), a GPS reception module 312 (e.g., a GPS receiver), a control module 311 (e.g., a controller), a battery 316, and an antenna.

The broadband communication module 313 supports IoT platform-based low-power broadband communication (Cat.M1). The commercial LoRa module 314 supports a wireless protocol with a commercial LoRa network, and the private LoRa module 315 supports a wireless protocol with a private LoRa network.

The GPS reception module 312 provides the current location (or location information) of the managing vessel terminal device 300 using a GPS signal received from a GPS satellite.

The control module 311 is connected with the managing vessel terminal 320 via Ethernet or wireless-fidelity (Wi-Fi) and selectively connects to a commercial LoRa network and a private LoRa network depending on the network condition. The control module 311 sets communication options according to a normal situation (or normal condition) and an event situation (or event condition or simply 'event'), and performs various control operations on the modules in the managing vessel wireless router 310.

The battery 316 provides power required for the operation of the wireless router 310.

The fishing vessel terminal device 200 may have substantially the same configuration as the managing vessel terminal device 300, and no duplicate description thereof is given below.

Figure 4:
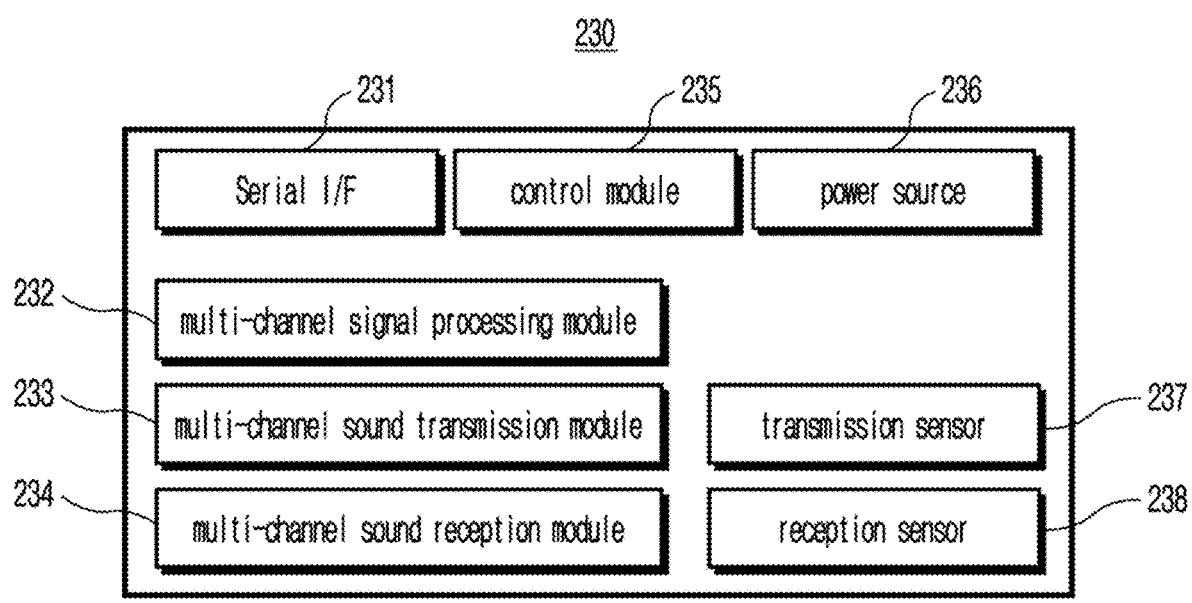
FIG. 4 is a view illustrating a configuration of an underwater sound tracker according to an embodiment.

FIG. 4 is a view illustrating a configuration of an underwater sound tracker according to an embodiment.

Referring to FIG. 4, the underwater sound tracker 230 includes a serial interface (I/F) unit 231 (e.g., a serial interface), a multi-channel signal processing module 232 (e.g., a multi-channel signal processor), a multi-channel sound transmission module 233 (e.g., a multi-channel sound transmitter), a multi-channel sound reception module 234 (e.g., a multi-channel sound receiver), a control module 235 (e.g., a controller), a power source 236, a transmission sensor 237, and a reception sensor 238.

The serial interface unit 231 is connected with the fishing vessel terminal 220 using serial communication, e.g., RS-232C.

The transmission sensor 237 and the reception sensor 238, respectively, transmit and receive acoustic signals (or sound signals) to/from the buoy 100.

To detect all the information transmitted from the buoy 100, the multi-channel sound transmission module 233, the multi-channel sound reception module 234, and the multi-channel signal processing module 232 are implemented in a structure having at least four channels. The multi-channel sound transmission module 233, the multi-channel sound reception module 234, and the multi-channel signal processing module 232 receive a sound signal of a frequency band ranging from 5 Hz to 2,400 Hz at a certain depth, analyze the strength and direction of the signal, multiplex/demultiplex the signal, and then transmits the signal.

Upon receiving a communication option, such as signal strength or pulse width, and identification information for the buoy from the fishing vessel terminal 220, the control module 235 transmits the corresponding information to the buoy 100 according to the communication option. The control module 235 receives identification information and battery status information from the buoy 100 and transmits the identification information, battery status information, and distance information for the buoy to the fishing vessel terminal 220. In this case, the control module 235 may obtain distance the distance (or distance information) from the buoy by analyzing the sound signals transmitted and received to/from the buoy.

The power source 236 (e.g., a battery) provides power required for the operation of the underwater sound tracker 230.

The configuration of the underwater acoustic tracker 230 described above may be applied to the underwater acoustic tracker 330 of the managing vessel terminal device 300. In other words, the underwater acoustic tracker 230 of the fishing vessel terminal device 200 and the underwater acoustic tracker 330 of the managing vessel terminal device 300 may have substantially the same configuration.

Figure 5:
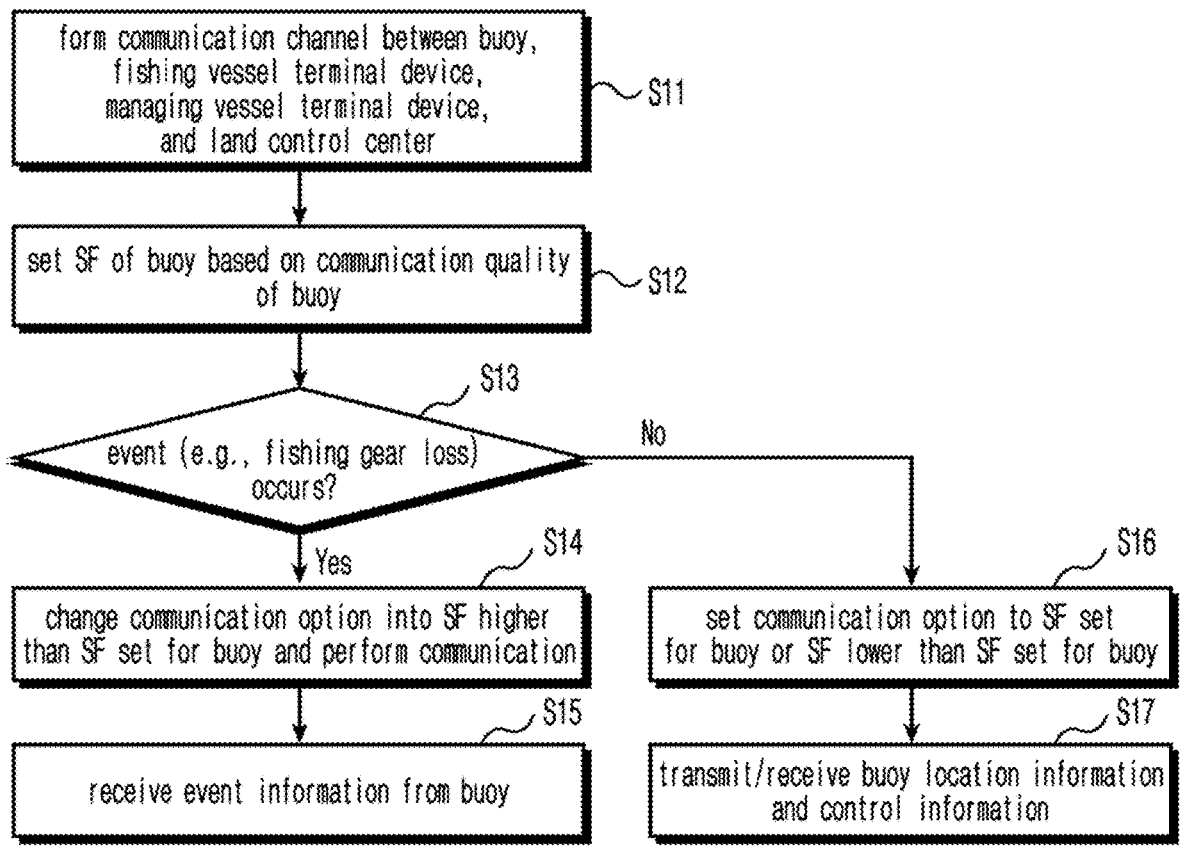
FIG. 5 is a flowchart illustrating a maritime wireless communication method according to an embodiment.

FIG. 5 is a flowchart illustrating a maritime wireless communication method according to an embodiment. FIG. 6 is a view illustrating a LoRa-based communication option according to an embodiment.

Referring to FIGS. 5 and 6, the fishing vessel wireless node 210 or the managing vessel wireless router 310, which may be a gateway or a gateway device, selectively accesses or connects to a commercial LoRa network or a private LoRa network according to the radio wave condition, thereby establishing a communication channel (S11).

The buoy 100, the fishing vessel terminal device 200, the managing vessel terminal device 300, and the land control center 400 form a communication channel based on LoRa for low-power, long-range communication.

The land control center 400 forms a main communication channel with the buoy 100, the fishing vessel terminal device 200, and the managing vessel terminal device 300 using a commercial LoRa network (e.g., a public LoRa network). Accordingly, the land control center 400 may receive a report of the location of the buoy 100 and fishing gear information from the buoy 100 and may transmit buoy control signals to each buoy 100 through the main communication channel. Further, the land control center 400 may receive fishing gear information and buoy location information from the fishing vessel wireless node 210 and transmit fishing gear loss information to the fishing vessel wireless node 210 through the main communication channel. The land control center 400 may transmit and receive information for all the buoys and fishing gears in the area controlled or managed by the managing vessel, and fishing gear loss information to/from the managing vessel wireless router 310. Communication may be established between the land control center 400 and the managing vessel wireless router 310 for sharing information, such as fishing gear loss and other relevant information related to all of the buoys and fishing gears in the area controlled or managed by the managing vessel. Accordingly, the managing vessel terminal 320 may receive a result of determination (e.g., information about loss of fishing gear) from the land control center 400 using a commercial long-term evolution (LTE) network (CAT. M1).

In a shadow area which is out of the communication coverage, the buoy 100, the fishing vessel wireless node 210, and the managing vessel wireless router 310 may release the main communication channel through the commercial LoRa network and establish a sub communication channel using the private LoRa network to transmit and receive information.

The buoy 100, the fishing vessel terminal device 200, and the managing vessel terminal device 300 determine the communication state using an acknowledgment (Ack)/negative-acknowledgment (Nack) response signal responsive to a traffic request. When the communication state is good, the buoy 100, the fishing vessel terminal device 200, and the managing vessel terminal device 300 transmit and receive information via the main communication channel but, upon failing to receive an Ack response signal during a preset time via the main communication channel, determine that the communication through the main communication channel is disconnected and form a sub communication channel to the private LoRa network.

As such, the buoy 100, the fishing vessel terminal device 200, and the managing vessel terminal device 300 may selectively connect to the commercial LoRa network and the private LoRa network depending on the state or condition of the radio wave or propagation of the radio wave, thereby securing a communication speed and communication connectivity.

The gateway device (e.g., fishing vessel wireless node 210 or the managing vessel wireless router 310) measures the communication quality based on the signal quality including the received signal strength indication (RSSI) and signal-to-noise ratio (SNR) of the signal transmitted or received with the buoy 100 and sets a reference spreading factor applied to each buoy based on the measured communication quality (S12).

The gateway device (e.g., fishing vessel wireless node 210 or the managing vessel wireless router 310) performs normal communication with the buoy 100 using the set reference spreading factor and, upon detecting an event situation, e.g., a stealing or loss of the buoy 100 or fishing gear (S13), changes the reference spreading factor into a higher spreading factor than the reference spreading factor and receives event information (e.g., fishing gear loss information including the state of fishing gear loss and GPS information) from the buoy 100 (S14 and S15).

In the LoRa-based communication network, the transmission distance and transmission speed vary depending on the spreading factor applied to the buoy 100 and the gateway device (e.g., fishing vessel wireless node 210 or the managing vessel wireless router 310). As illustrated in FIG. 6, in the LoRa-based communication network, the spreading factor is a major feature that is responsible for the quality of communication, and the data transmission rate (e.g., bitrate) and data transmission speed (e.g., time-on-air) vary depending on the spreading factor. For example, it may be identified from FIG. 6 that as the spreading factor increases, the minimum SNR value (i.e., SNS limit) and the data transmission rate (i.e., bitrate) decrease, but the spreading range and the data transmission speed (i.e., time-on-air) increase and vice versa (in other words, as the spreading factor decreases, the minimum SNR value (i.e., SNS limit) and the data transmission rate (i.e., bitrate) increase, but the spreading range and the data transmission speed (i.e., time-on-air) decrease). For instance, from FIG. 6 is observed that the lower the spreading factor, the higher the data transmission rate (i.e., bitrate), but lower the application range. Additionally, the higher the spreading factor is, the higher the packet latency and energy consumption, and the lower the data transmission rate. The capacity of a LoRaWAN network is a function of its gateway density. To maximize the capacity of the network, using an adaptive data rate (ADR) mechanism is essential. The main goal of ADR is to save the battery power of the LoRaWAN end-nodes. By having the end-nodes closest to a gateway transmit using the lowest spreading factor, their time on air is minimized, thereby prolonging their battery life. More distant sensors transmit at a higher spreading factor. A trade-off is made between battery power and distance given that a higher spreading factor allows for a gateway to connect to devices that are farther away.

In general, in a normal situation where normal communication is required, a lower spreading factor in which both time and energy may be saved, and a high communication speed is provided may be used, but the success rate of the communication may be reduced. It may be preferable to change the communication option into a higher spreading factor in which packet loss is reduced and communication success rate is increased upon detecting an event, such as a stealing or loss of fishing gear.

Accordingly, the gateway device (e.g., fishing vessel wireless node 210 or the managing vessel wireless router 310) may set the reference spreading factor to '7' and, when an event, e.g., stealing or loss of fishing gear, occurs, may use a communication option for the spreading factor between 7 and 12, but it may be preferable to change the spreading factor into 12 when such an event occurs. When the reference spreading factor is set to 7, the response time is shortest, and the most data may be transmitted. However, if the reception sensitivity is low, the spreading factor may be adjusted upon transmission.

When no event situation is detected (S13), the gateway device (e.g., fishing vessel wireless node 210 or the managing vessel wireless router 310) communicates with the buoy 100 at a spreading factor not more than the reference spreading factor to receive location information or battery status information from the buoy 100 and transmits control information to the buoy 100 (S16 and S17).

If the communication state or condition is good, communication between the buoy 100 and the land control center 400 is performed via the commercial LoRa network. The land control center 400 may determine whether to change the spreading factor after measuring the signal quality using the information received from the buoy 100, so that the communication quality between the land control center 400 and the buoy 100 may be enhanced.

Meanwhile, when communication is disconnected, communication is performed between the gateway device (e.g., fishing vessel wireless node 210 or the managing vessel wireless router 310) and the buoy 100 through the private LoRa network. The gateway device (e.g., fishing vessel wireless node 210 or the managing vessel wireless router 310) may determine whether to change the spreading factor (SF) communication option after measuring the signal quality using the information received from the buoy 100, so that the communication quality between the gateway device and the buoy 100 may be enhanced.

Steps S11 to S17 of FIG. 6 may be divided into additional sub-steps or may be combined into fewer steps according to embodiments of the disclosure. Further, some of the steps may be omitted as necessary, or the order of the steps may be changed.

The above-described embodiments may be implemented in the form of recording media including computer-executable instructions, such as program modules. The computer-readable medium may be an available medium that is accessible by a computer. The computer-readable storage medium may include a volatile medium, a non-volatile medium, a separable medium, and/or an inseparable medium. The computer-readable storage medium may include a computer storage medium. The computer storage medium may include a volatile medium, a non-volatile medium, a separable medium, and/or an inseparable medium that is implemented in any method or scheme to store computer-readable commands, data architecture, program modules, or other data or information.

Although embodiments of the disclosure have been described with reference to the accompanying drawings, It will be appreciated by one of ordinary skill in the art that the disclosure may be implemented in other various specific forms without changing the essence or technical spirit of the disclosure. Thus, it should be noted that the above-described embodiments are provided as examples and should not be interpreted as limiting. Each of the components may be separated into two or more units or modules to perform its function(s) or operation(s), and two or more of the components may be integrated into a single unit or module to perform their functions or operations.

It should be noted that the scope of the disclosure is defined by the appended claims rather than the described description of the embodiments and include all modifications or changes made to the claims or equivalents of the claims.

What is claimed is:

1. A maritime wireless communication system performing wireless communication between at least one buoy, a fishing vessel terminal device, a managing vessel terminal device, or a land control center, the maritime wireless communication system comprising:
    a communication module installed in the at least one buoy, providing sensing information using at least one sensor, providing identification information and location information for the at least one buoy, and ensuring communication connectivity when an event condition including fishing gear loss occurs; and
    a gateway device installed in each of the fishing vessel terminal device and the managing vessel terminal device, performing communication with the at least one buoy and the land control center via a long range (LoRa)-based communication network to provide various types of fishery information including locations and conditions of a fishing vessel and fishing gear and a location of lost fishing gear, and setting different communication options for a normal condition and the event condition in performing a communication connection function, wherein
    the communication module of the at least one buoy and the gateway device installed in each of the fishing vessel terminal device and the managing vessel terminal device form a main communication channel through a public LoRa network for low-power long-range communication and, in a shadow area, releases the main communication channel with the public LoRa network and then forms a sub communication channel through a private LoRa network, and wherein the gateway device sets a reference spreading factor applied to each of the at least one buoy based on a communication quality of the at least one buoy and changes the reference spreading factor into a spreading factor higher than the reference spreading factor when the event condition occurs in performing communication with the at least one buoy, and the gateway device, when no event situation is detected, communicates with the at least one buoy at a spreading factor not more than the reference spreading factor to receive location information or battery status information from the buoy and transmits control information to the at least one buoy, wherein the at least one buoy includes:

a power module providing power required for operating the at least one buoy;

a sensor module including at least one of a temperature sensor, an acceleration sensor, and an acoustic sensor and providing detected information;

a global positioning system (GPS) reception module providing the location information for the at least one buoy using a GPS signal;

a light indicator indicating a location of the at least one buoy; and a control module processing a signal transmitted or received by the communication module and controlling an overall operation of the at least one buoy, wherein each of the fishing vessel terminal device and the managing vessel terminal device includes the gateway device, a terminal, and an underwater acoustic tracker, wherein the underwater acoustic tracker includes:

a serial interface (I/F) unit connected with the terminal using serial communication; a transmission sensor transmitting an acoustic signal to the at least one buoy;

a reception sensor receiving an acoustic signal from the at least one buoy;

a multi-channel signal processing module detecting all information transmitted from the at least one buoy;

a multi-channel sound transmission module and a multi-channel sound reception module receiving a sound signal of a frequency band ranging from 5 Hz to 2,400 Hz at a certain depth, analyzing a strength and direction of the sound signal, multiplexing or demultiplexing the analyzed sound signal, and then transmitting the multiplexed or demultiplexed sound signal;

a control module receiving a communication option and the identification information for the at least one buoy from the terminal, transmitting, to the at least one buoy, the identification information according to the communication option, receiving the identification information for the at least one buoy and battery status information from the at least one buoy, and transmitting the received identification information and battery status information to the terminal; and a battery providing power required for operating the underwater acoustic tracker, and wherein the gateway device measures the communication quality based on signal quality including a received signal strength indication (RSSI) or a signal-to-noise ratio (SNR) of a signal transmitted or received with the at least one buoy and sets the reference spreading factor based on the measured communication quality.

2. The maritime wireless communication system of claim 1, wherein the gateway device includes:

a broadband communication module supporting Internet-of-things (IoT) platform-based low-power broadband communication;

a public LoRa module supporting a wireless protocol with the public LoRa network; a private LoRa module supporting a wireless protocol with the private LoRa network;

a GPS reception module providing location information for the fishing vessel terminal device or the managing vessel terminal device using a GPS signal; and a control module selectively connecting to the public LoRa network or the private LoRa network depending on a state of the public LoRa network or the private LoRa network, setting a communication option depending on the normal condition or the event condition, and controlling the broadband communication module, the public LoRa module, the private LoRa module, and the GPS reception module.

3. The maritime wireless communication system of claim 1, wherein as the reference spreading factor increases, a spreading range and a data transmission speed of the gateway device increase.

4. The maritime wireless communication system of claim 1, wherein as the reference spreading factor increases, a minimum SNR value and a data transmission rate of the gateway device decrease.

5. A maritime wireless communication method performing wireless communication between at least one buoy, a fishing vessel terminal device, a managing vessel terminal device, or a land control center, the maritime wireless communication method comprising setting a reference spreading factor applied to each of the at least one buoy based on a communication quality of the at least one buoy by a gateway device installed in the fishing vessel terminal device or the managing vessel terminal device;

performing communication with the at least one buoy using the set reference spreading factor to receive sensing information obtained using at least one sensor and identification information and location information for the at least one buoy; and analyzing the information received from the at least one buoy and, when an event condition including fishing gear loss occurrence, changing the reference spreading factor into a spreading factor higher than the reference spreading factor in performing communication with the at least one buoy, wherein the gateway device, when no event situation is detected, communicates with the at least one buoy at a spreading factor not more than the reference spreading factor to receive location information or battery status information from the at least one buoy and transmits control information to the at least one buoy, and wherein the at least one buoy includes:

a power module providing power required for operating the at least one buoy;

a sensor module including at least one of a temperature sensor, an acceleration sensor, and an acoustic sensor and providing detected information;

a global positioning system (GPS) reception module providing the location information for the at least one buoy using a GPS signal;

a light indicator indicating a location of the at least one buoy; and a control module processing a signal transmitted or received by a communication module and controlling an overall operation of the at least one buoy, wherein each of the fishing vessel terminal device and the managing vessel terminal device includes the gateway device, a terminal, and an underwater acoustic tracker, wherein the underwater acoustic tracker includes:

a serial interface (I/F) unit connected with the terminal using serial communication;

a transmission sensor transmitting an acoustic signal to the at least one buoy;

a reception sensor receiving an acoustic signal from the at least one buoy;

a multi-channel signal processing module detecting all information transmitted from the at least one buoy;

a multi-channel sound transmission module and a multi-channel sound reception module receiving a sound signal of a frequency band ranging from 5 Hz to 2,400 Hz at a certain depth, analyzing a strength and direction of the sound signal, multiplexing or demultiplexing the analyzed sound signal, and then transmitting the multiplexed or demultiplexed sound signal;

a control module receiving a communication option and the identification information for the at least one buoy from the terminal, transmitting, to the at least one buoy, the identification information according to the communication option, receiving the identification information for the at least one buoy and battery status information from the at least one buoy, and transmitting the received identification information and battery status information to the terminal; and a battery providing power required for operating the underwater acoustic tracker, and wherein the gateway device measures the communication quality based on signal quality including a received signal strength indication (RSSI) or a signal-to-noise ratio (SNR) of a signal transmitted or received with the at least one buoy and sets the reference spreading factor based on the measured communication quality.

6. The maritime wireless communication method of claim 5, further comprising:

before setting the reference spreading factor, forming a main communication channel through a public LoRa network for low-power, long-range communication and, in a shadow area, releasing the main communication channel with the public LoRa network and then forming a sub communication channel through a private LoRa network.

7. The maritime wireless communication method of claim 5, wherein as the reference spreading factor increases, a spreading range and a data transmission speed of the gateway device increase.

8. The maritime wireless communication method of claim 5, wherein as the reference spreading factor increases, a minimum SNR value and a data transmission rate of the gateway device decrease.

* * * * *